United States Patent
Pharris

[11] 3,907,219
[45] Sept. 23, 1975

[54] HIGH SPEED, LONG RANGE TURBO-JET AIRCRAFT

[76] Inventor: Jack W. Pharris, 1210 Porto Rico Ave., Alamogordo, N. Mex. 88310

[22] Filed: Oct. 26, 1973

[21] Appl. No.: 409,887

Related U.S. Application Data

[63] Continuation-in-part of Ser. No. 297,911, Oct. 16, 1972, abandoned.

[52] U.S. Cl. ............... 244/7 A; 244/12 D; 416/149
[51] Int. Cl. ..................... B64c 27/22; B64c 27/30
[58] Field of Search............ 244/6, 7 R, 7 A, 17.11, 244/17.19, 17.23, 23 D; 415/147; 60/39.15, 39.2, 226; 416/161, 23, 149, 150

[56] References Cited
UNITED STATES PATENTS

| | | | |
|---|---|---|---|
| 2,094,105 | 9/1937 | Myers | 244/7 R |
| 2,464,285 | 3/1949 | Andrews | 244/7 R |
| 2,571,662 | 10/1951 | Black | 244/6 |
| 2,629,568 | 2/1953 | Croshere et al. | 244/17.23 |
| 2,699,299 | 1/1955 | Herrick | 244/7 A |
| 2,749,059 | 6/1956 | Meyers et al. | 244/7 R |
| 2,792,189 | 5/1957 | Altemus | 244/7 R |
| 2,951,660 | 9/1960 | Giliberty | 244/23 D |
| 2,974,900 | 3/1961 | Morris et al. | 415/147 |
| 3,019,600 | 2/1962 | Peek | 415/147 |
| 3,448,946 | 6/1969 | Nagatsu | 244/7 A |
| 3,678,690 | 7/1972 | Shohet | 244/7 R |

*Primary Examiner*—Trygve M. Blix
*Assistant Examiner*—Galen L. Barefoot
*Attorney, Agent, or Firm*—Clarence A. O'Brien; Harvey B. Jacobson

[57] ABSTRACT

An aircraft forwardly propelled by fan jet engines during fixed wing flight, is operated in a VTOL mode by powered rotation of a rotary wing through a rotor assembly in an extended position. Power for the rotor assembly is obtained from the engines through a transmission disengaged for autogyro operation during transition to or from fixed wing flight. The rotor assembly is braked and retracted after it is unloaded from the engines in order to accommodate fixed wing flight.

10 Claims, 12 Drawing Figures

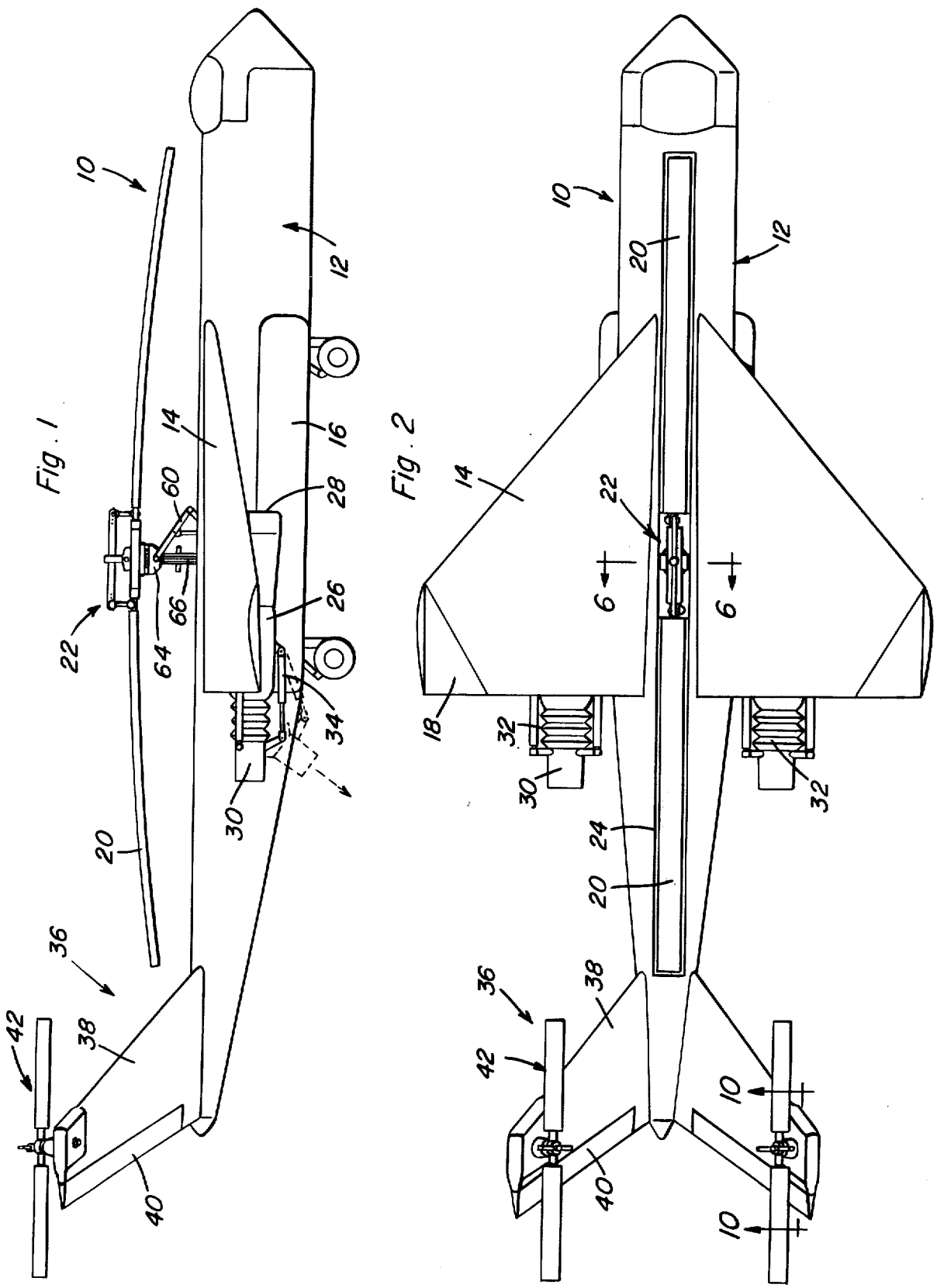

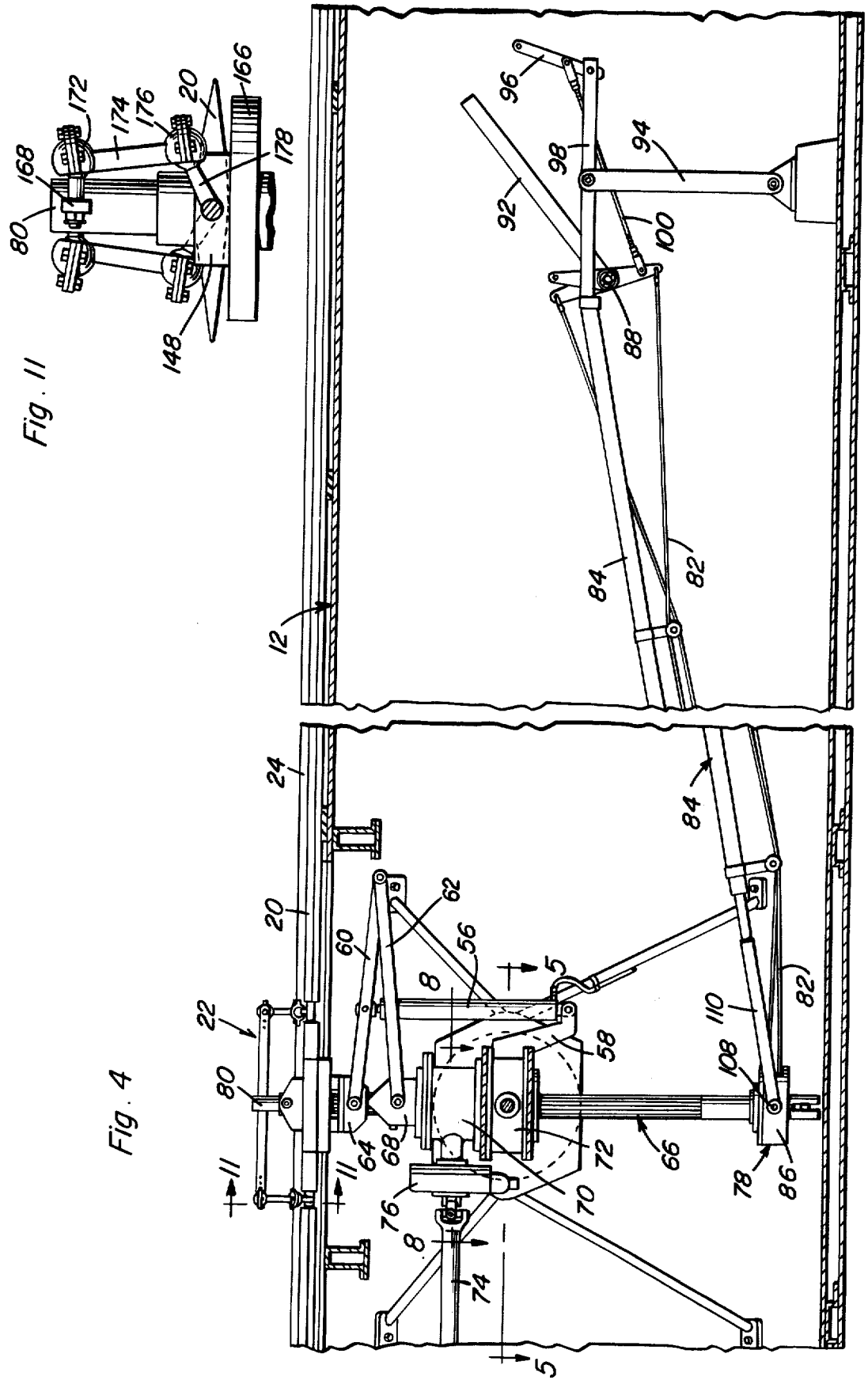

HIGH SPEED, LONG RANGE TURBO-JET AIRCRAFT

This is a continuation-in-part application of my copending application Serial No. 297,911, filed Oct. 16, 1972, for VTOL TURBO-JET AIRCRAFT now abandoned.

This invention relates to a type of aircraft propelled by jet engines conditioned for low speed operation to power a rotary wing assembly for vertical ascent or descent purposes, the rotary wing assembly being retracted and disengaged from the engines during fixed wing flight.

Aircraft of the aforementioned type that operate in both helicopter and fixed wing flight are well known, including aircraft having retractable rotary wing assemblies, as well as aircraft propelled by jet engines having power take-offs to the rotor assembly of the rotary wing. However, such prior aircraft suffered from vibration and fatigue wear problems because of the incompatability between helicopter and fixed wing operation. Further, such prior aircraft designs were forced to accept unsatisfactory compromises with respect to the selection of power plants from which power for producing thrust and vertical lift is obtained. It is, therefore, an important object of the present invention to provide a new improved composite aircraft that will overcome the disadvantages associated with the convertible types of aircraft aforementioned and which will nevertheless embody conventional features of high speed, long range jet aircraft having a VTOL capability.

The composite type of aircraft of the present invention is not only endowed with the stability of a fixed wing, high speed airplane having an effective airframe attitude control system, but is also endowed with VTOL hovering and slow flight capabilities. The incompatability in attitude control and propulsion mode requirements between high speed, fixed wing and VTOL operations, is achieved by a rotor assembly arrangement that accommodates a transitional autogyro operation between helicopter and fixed wing flight operations. To that end, the rotor assembly features a tubular rotor shaft that is axially displaceable, along a vertical axis fixed to the airframe, between extended and retracted positions. The rotor shaft is externally splined intermediate its opposite ends for driving connection to the tail rotors associated with a "V" tail assembly and a mechanical brake. The tail assembly also includes elevator and rudder elements for pitch and yaw control of the airframe during VTOL and fixed wing operations. The rotary wing assembly serves only to produce vertical lift while the reaction thrust of the jet engines is arranged to enhance airframe stability and hovering capability during VTOL operations as well as to provide forward propulsion during autogyro and fixed wing operations. Torque is transmitted from the engines to the rotor shaft during powered rotation of the rotary wing assembly through a one-way, sprag-type clutch that is fixedly mounted in the airframe or fuselage of the aircraft, the rotor shaft being axially slidable relative to the clutch assembly by a powered retracting mechanism. In the extended position of the rotor shaft, the rotary wing assembly is supported by a bearing assembly secured to the upper end portion of the rotor shaft. This bearing assembly provides rigid support for the hub of the rotary wing assembly only in a direction parallel to the longitudinal axis of the airframe or fuselage while accommodating flapping of the rotary wing assembly laterally of the fuselage. The flapping of the rotary wing assembly in the lateral direction cooperates with the tail rotors associated with the V-tail assembly aforementioned in order to provide airframe stability during VTOL operations. Adjustable thrust vectoring nozzles associated with the jet engines are also provided in order to oppose attitude changing forces applied to the airframe during VTOL operations, such as reverse thrust produced by the tail rotors and any unbalanced forces produced during powered rotation of the rotary wing assembly. During such powered rotation of the rotary wing assembly, the jet engines are loaded through a transmission drivingly interconnecting the engines with the rotor shaft, the transmission including a worm and worm wheel reduction gear assembly, a disengageable, positive-type clutch, fluid transmitters of the torque multiplying type and the one-way clutch assembly aforementioned. During powered rotation of the rotary wing assembly, the jet engines are conditioned for low speed operation by closing of vanes in an inflow control assembly thereby reducing the intake of air to the compressor stage to which the reduction gear assembly is connected.

Pitch control for the rotary wing assembly is provided by means of an axially displaceable pitch control shaft that extends through and is rotatable with the rotor shaft. A non-rotatable casing operatively connected to the lower end of the rotor shaft slidably mounts a screw that is axially shifted by rotation of a nut in order to axially displace the pitch control shaft. The nut is actuated by a control cable supported on a telescoping tube assembly which is pivotally connected at one end to the non-rotatable casing for displacement with the rotor shaft between the extended and retracted positions. An operating lever assembly connected to the telescoping tube assembly enables the aircraft pilot to achieve corrective pitch control, interrelated with engine throttle control, throttle control being exercised independently of any pitch control while the rotary wing assembly is retracted.

The spline portion of the rotor shaft is drivingly engaged with a tail rotor drive gear drivingly connected to a mechanical brake assembly for stopping rotation of the rotary wing assembly and the tail rotors prior to retraction of the rotary wing assembly when fixed wing flight conditions are achieved. A camming arrangement is provided to angularly orientate the rotary wing assembly to a proper position as it is fully retracted into a recess formed within the top of the aircraft fuselage for this purpose. A mmechanical lock associated with the camming assembly holds the rotary wing assembly in this angular position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a typical aircraft constructed in accordance with the present invention with its rotary wing assembly extended.

FIG. 2 is a top plan view of the aircraft shown in FIG. 1.

FIG. 4 is an enlarged partial side sectional view through the fuselage of the aircraft showing the retractable rotor and rotary wing assemblies in the retracted position and the integrated, collective pitch control assembly.

FIG. 11 is an enlarged partial sectional view, taken substantially through a plane indicated by section line 11—11 in FIG. 4.

Figure 3:
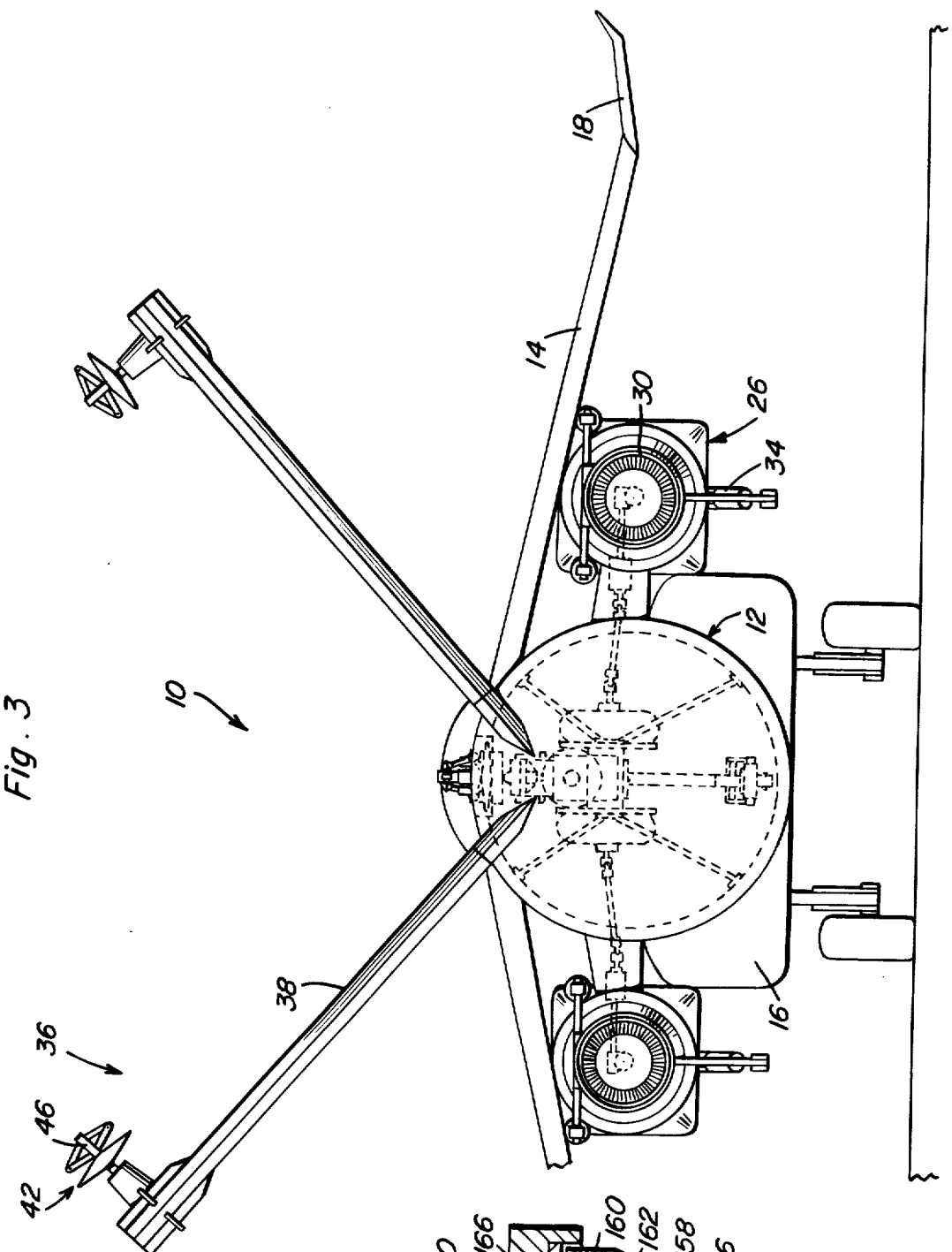
FIG. 3 is a rear elevational view of the aircraft shown in FIGS. 1 and 2, rut with the rotary wing assembly in a retracted position.

Referring now to the drawings in detail, FIGS. 1, 2 and 3 illustrate an aircraft constructed in accordance with the present invention and generally denoted by reference numeral 10. The airframe of the aircraft includes an elongated tubular fuselage generally referred to by reference numeral 12 from which a pair of delta-shaped, fixed wings 14 extend from the middle section and located above a pair of fuel tanks 16 mounted on the lower bottom of the fuselage. The fixed wings 14 are provided with a negative dihedral and an extra large pair of ailerons 18 pivoted along hinge lines tilted forwardedly at the outer tips of the wings between 45° and 60° to the lateral axis of the aircraft so as to encompass almost the entire wing tip. This arrangement not only provides the aircraft with normal aileron control during conventional fixed wing flight, but also provides roll control during VTOL operations by reason of its vectoring ability with respect to the slipstream downwash from the rotor blades 20 associated with a rotary wing assembly 22 shown in an extended position in FIG. 1. The top of the fuselage 12 is provided with an elongated recess 24, as more clearly seen in FIG. 2, adapted to receive the rotary wing assembly in a retracted position as shown in FIG. 3.

Secured to the underside of the fixed wings 14 are a pair of fan-jet engines 26 having intake ends 28 and vectoring control, exhaust nozzles 30 connected to the casing of the engines through adjustable bellows 32. The control nozzles 30 are selectively adjusted, for directing the reaction thrust, by a plurality of hydraulic control devices 34 between raised and lowered positions as shown by solid and dotted lines in FIG. 1.

Figure 10:
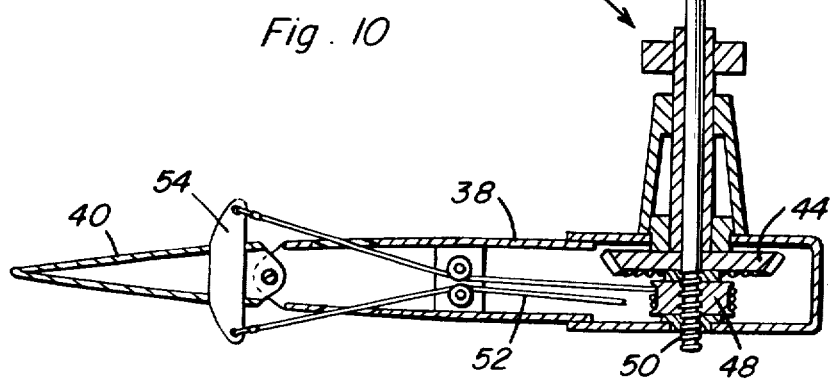
FIG. 10 is an enlarged partial sectional view, taken substantially through a plane indicated by section line 10—10 in FIG. 2.

A V-shaped tail assembly generally denoted by reference numeral 36 is connected to the rear end of the fuselage and includes the upwardly diverging stabilizer panels 38 fixed to the fuselage and pivotally mounting the rearwardly extending rudder-elevator elements 40. Tail rotor assemblies 42 are mounted on each panel 38 adjacent the outer tips thereof and just forwardly of the rudder-elevator elements 40. As more clearly seen in FIG. 10, each of the tail rotor assemblies 42 is driven through a gear 44 and is provided with a pitch control shaft 46 that is axially displaced by control nut 48 through a screw element 50. The nut 48 is rotationally actuated by cable controls in a manner well known to those skilled in the art and such control actuation is coordinated through the cable 52 and control tab 54 with the related adjustment of the control element 40. Accordingly, the tail rotor assemblies 42 will control movement of the tail portion of the aircraft in vertical or lateral directions during powered rotation of the rotary wing assembly. Conventional control of the aircraft during fixed wing operation is also provided for through the control elements 40 on the tail assembly.

Referring now to FIG. 4 in particular, the rotary wing assembly 22 is vertically displaced relative to the fuselage 12 by means of a power operated retracting mechanism which includes a hydraulic piston device 56 pivotally anchored to the fuselage through an anchoring bracket 58. The piston shaft associated with the hydraulic device 56 is pivotally connected to an actuating lever 60 pivotally connected at one end to lever 62 and at the other end to an axially shiftable bearing support assembly 64 that is operatively connected to a rotor shaft assembly 66 rotatable about a fixed axis intersecting the longitudinal axis of the fuselage and perpendicular thereto. The lever 62 on the other hand is pivotally anchored to the fuselage through a cam and rotor locking assembly 68. The cam and locking assembly 68 is fixed to the upper end of a gear casing 70 which in turn is positioned above a one-way clutch assembly 72. The rotor shaft assembly 66 is axially slidable through the gear casing 70 and the assemblies 68 and 72 between the retracted position shown in FIG. 4 and the extended position shown in FIG. 1 in order to elevate the rotary wing assembly 22 from the top recess 24 in the fuselage by means of the bearing assembly 64 in response to extension of the hydraulic piston device 56. Suitable fluid connections to pilot operated valve controls, well known to those skilled in the art, are provided for this purpose.

Torque is transmitted to the rotary wing assembly 22 through the clutch assembly 72 and the rotor shaft assembly 66 when displaced to its extended position. Rotation of the rotor shaft assembly 66 is also transmitted to the tail rotors 42 through a suitable drive connection including the drive shaft 74 as shown in FIG. 4. A mechanical brake assembly 76 is provided in order to stop rotation of the rotary wing assembly 22 and the tail rotors 42 in preparation for conventional, fixed wing flight.

Figure 7:
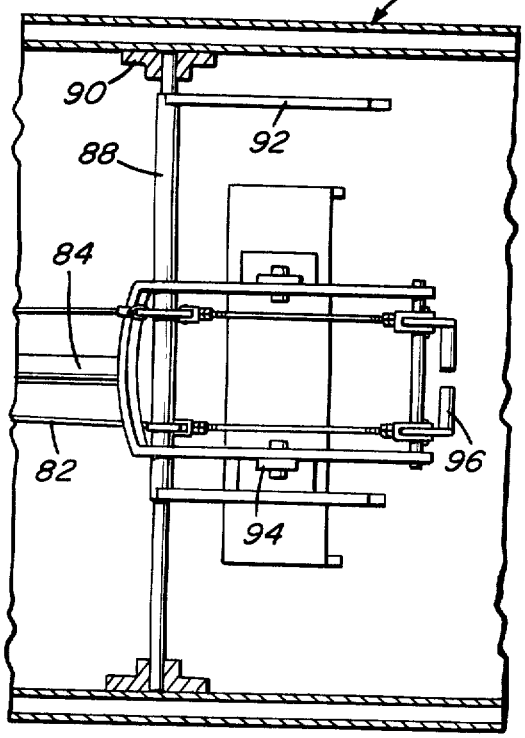
FIG. 7 is a partial top sectional view through the fuselage of the aircraft showing the interrelated pitch and throttle controls.

A collective pitch control mechanism generally referred to by reference numeral 78 in FIG. 4 is operatively connected to the lower end portion of the rotor shaft assembly 66 and is axially displaceable therewith between the retracted and extended positions of the rotor assembly. The angle of attack or pitch of the rotary wing blades 20 are varied under control of the pilot through the pitch control mechanism 78 and a pitch control shaft 80 extending through the rotor shaft assembly. The pitch control mechanism 78 is actuated through flexible steel cables 82 supported on a telescoping tube assembly 84 pivotally connected at one end to the casing 86 of the pitch control mechanism 78. The actuating cables 82 are connected to control arms that are rotatably mounted by the fuselage through a control shaft 88 received in end bearing assemblies 90 as shown in FIG. 7. A pitch control lever 92 is connected to the control shaft, as shown in FIGS. 4 and 7, for manually readjusting the pitch of the rotary wing assembly through the actuating cable 82 when the rotor assembly is in the extended position. The telescoping support tube assembly 84 pivotally connected to the casing 86 of the pitch control mechanism 78, is displaceable therewith and is pivotally supported on the fuselage by means of the support links 94. Thus, only in the extended position of the rotor assembly will the actuating cables 82 be under proper tension for exercising pitch control through the control lever 92. Throttle levers 96 pivotally mounted on the extensions 98 of the telescoping support tube assembly 84, will accordingly be simultaneously actuated through the links 100 when the pitch control levers 92 are manipulated by the pilot during powered rotation of the rotary wing assembly. However, when the rotary wing assembly is retracted, and the actuating cables 82 are in an inoperative, slackened condition, the throttle controls 96 may be operated independently of the pitch control mechanism 78 for conventional fixed wing flight operation.

Figure 6:
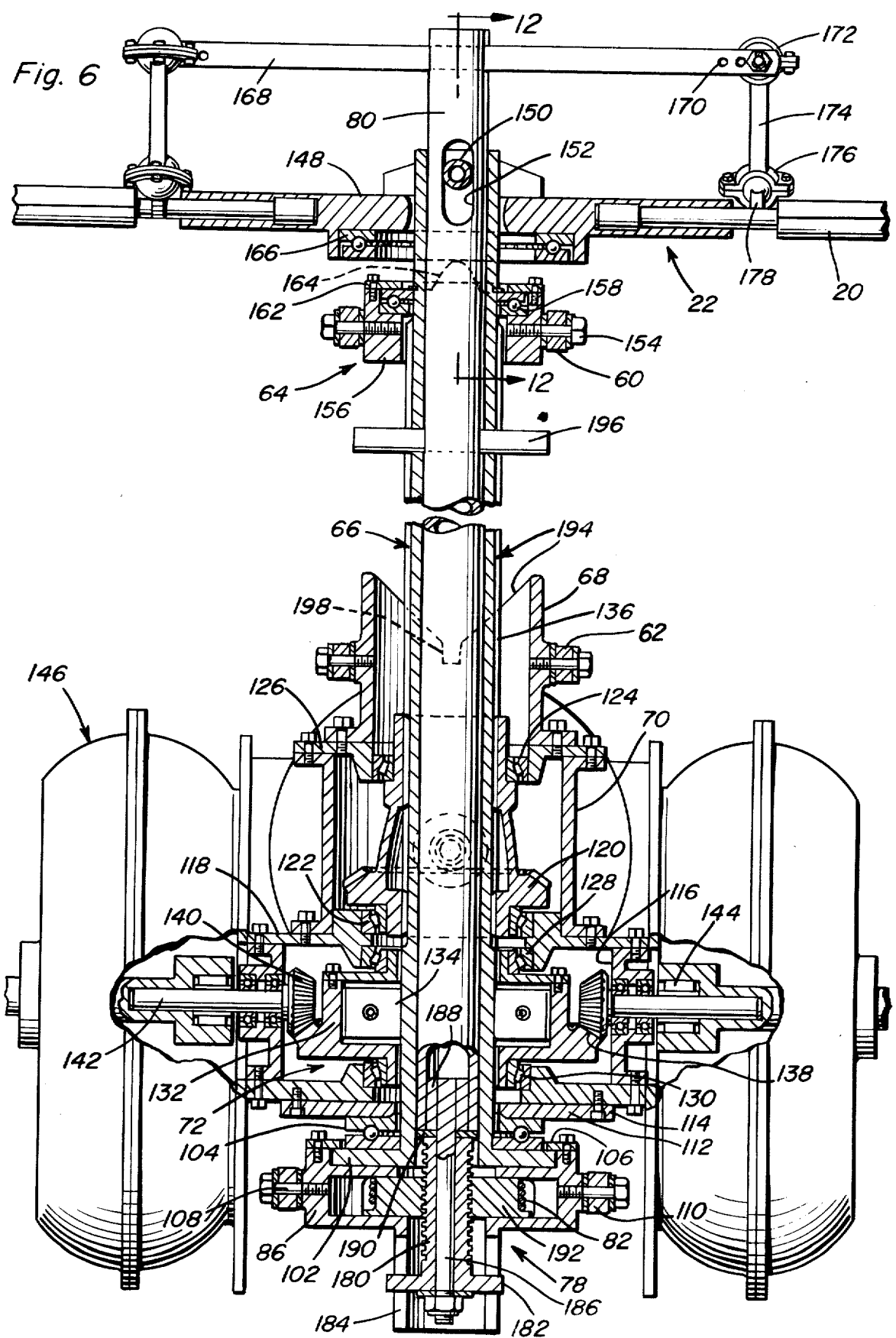
FIG. 6 is an enlarged vertical sectional view through the rotor and rotary wing assembly in its extended position, taken substantially through a plane indicated by section 6—6 in FIG. 2 with the rotor rotated 90°.

Referring now to FIG. 6, the rotor shaft assembly 66 is connected at its lower end to the housing 86 of the pitch control mechanism 78 by means of a flange 102. An axial thrust bearing assembly 104 is secured to the flange 102 in order to accommodate rotation of the rotor shaft relative to the axially fixed clutch assembly 72 when in abutment therewith as shown. The casing 86 of the control mechanism 78, on the other hand, is held assembled with the flange 102 by means of the retainer ring 106. Thus, the casing 86 will be axially displaceable with the rotor shaft assembly 66 and held again rotation by the pivotal connections to a yoke portion 110 of the telescoping support tube assembly 84.

In the upper extended position of the rotor shaft assembly 66, as shown in FIG. 6, the bearing assembly 104 abuts the bearing plate 112 secured to the underside of the end wall 114 which is connected to the annular housing 116 for the one-way clutch assembly 72. The opposite end wall 118 of the clutch housing is in turn secured to the gear housing 70 enclosing the tail rotor drive gear 120. The tail rotor drive gear 120 is rotatably mounted by spaced bearing assemblies 122 and 124 assembled within the end wall 118 of the clutch housing and an end wall 124 interconnected with the gear casing 70 and the cam and lock assembly 68. The end walls 118 and 114 also mount bearing assemblies 128 and 130 which rotatably mount the outer race member 132 of the one-way clutch assembly 72, internally engaged by the sprag elements 134 of a conventional type one-way clutch device. These sprag elements 134 also engage the external surface of the rotor shaft assembly 66 between the end flange 102 and an intermediate spline portion 136 with which the tail rotor drive gear 120 is engaged within the gear casing 70. The outer race member 132 of the one-way clutch assembly is provided with a gear formation 138 in meshing engagement with a pair of bevel gears 140 supported by bearings in the annular housing 116 of the one-way clutch assembly. The gear shafts 142 that extend 180° from each other from the one-way clutch assembly, are coupled by means of one-way clutches 144 to the driven members of a pair of fluid transmitters 146 of the torque multiplying type through which torque is transmitted from the jet engines to the rotor shaft assembly via the one-way clutch assembly 72. In this fashion, the rotor shaft assembly may overrun the low speed drive supplied thereto from the jet engines as the aircraft speed increases and autogyro operation begins during the transition to conventional, fixed wing flight.

Figure 12:
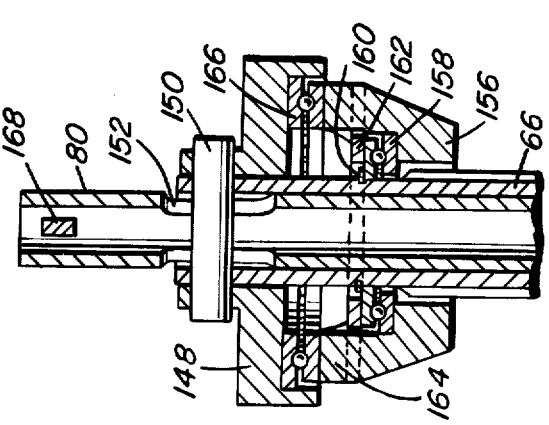
FIG. 12 is a partial sectional view, taken substantially through a plane indicated by section line 12—12 in FIG. 6.

The rotary blades 20 of the rotary wing assembly 22 are carried by the rotor hub 148, as more clearly seen in FIG. 6, the hub 148 being secured to the upper end portion of the rotor shaft assembly 66 by means of the pin 150 which extends through a slot 152 in the pitch control shaft 80. The rotor hub 148 is supported by the bearing assembly 64 to which the actuating lever 60 is pivotally connected by means of the pivot connections 154. The bearing assembly 64, as more clearly seen in FIG. 12, includes a non-rotatable, annular member 156 within which the ball bearing assembly 158 is seated and from which the pivot connections 154 extend. A lock ring 160 axially fixes the bearing assembly to the rotor shaft 66 through the ball bearing assembly 158 which is held assembled within the annular member 156 by the retainer ring 162. While one race of the ball bearing assembly 158 is fixed by the ring 162 to the rotor shaft in order to prevent relative axial movement between the rotor shaft and the bearing assembly 64, the annular member 156 is non-rotatable by virtue of its pivotal connection to the actuating lever 60. Further, the annular member 156 is provided with a pair of engaging formations 164 spaced 180° from each other and aligned along the longitudinal axis of the fuselage in order to provide rigid support in the direction of the longitudinal axis for the rotor hub 148. It will be apparent, however, that such rigid support will not be available for the rotor hub 148 in lateral directions relative to the fuselage so as to permit flapping of the rotary wing assembly in such lateral directions. This lateral flapping freedom for the rotary wing assembly cooperates with the control exercised through the tail rotor assemblies 42 to provide stability for the aircraft and attitude control during powered rotation of the rotary wing assembly.

With reference to FIGS. 6 and 11, pitch adjustment is effected through the pitch control shaft 80 by means of the pitch control bar 168 extending through the upper portion of the pitch control shaft generally parallel to the rotor blades 20. Opposite end portions of the bar 168 are provided with a plurality of openings 170 through which the bar is connected by universal joints 172 to links 174 on opposite sides of the rotor hub. The lower ends of the links 174 are connected by universal joints 176 to pitch adjusting levers 178 connected to the rotor blades 20. Accordingly, the opposite rotor blades 20 will be angularly adjusted about their longitudinal axes in response to vertical displacement of the pitch control shaft 80.

The pitch control shaft 80 is axially shifted in order to effect a change in the pitch or angle of attack of the rotor blades 20 by means of the externally threaded screw element 180 as shown in FIG. 6. The lower end of the screw element is provided with a flange 182 slidably received in a slotted formation 184 projecting from the casing 86 of the pitch control mechanism 78.

Thus, the screw element 180 is prevented from rotation. The screw element is, however, connected by means of the bolt 186, connector 188 and thrust washer 190 to the lower end of the pitch control shaft so as to accommodate its rotation with the tubular rotor shaft 66. The screw element 180 is threadedly engaged by a nut element 192 rotatably mounted within the casing 86 and peripherally engaged by the actuating cable 82. Accordingly, rotation of the nut element 192 in opposite directions will produce a corresponding axial displacement of the screw element 180 in order to axially shift the pitch control shaft 80 relative to the rotor shaft 66 within the limits established by the slot 152 through which the coupling pin 150 extends to interconnect the rotor shaft with the rotor hub 148.

The cam and locking assembly 68 is fixed to the fuselage and is provided with an upper cam surface 194 as more clearly seen in FIG. 6 arranged to be engaged by the pin 196 extending radially from the rotor shaft 66. Accordingly, as the rotor assembly is retracted downwardly, the pin 196 upon engagement of the cam surface 194 will angularly rotate the rotor hub 148 and the rotary wing assembly toward a position parallel to the longitudinal axis of the fuselage. When the rotary wing assembly is fully retracted into the recess 24 formed in the top of the fuselage, the pin 196 will enter the notch 198 and thereby positively lock the rotary wing assembly.

Figure 5:
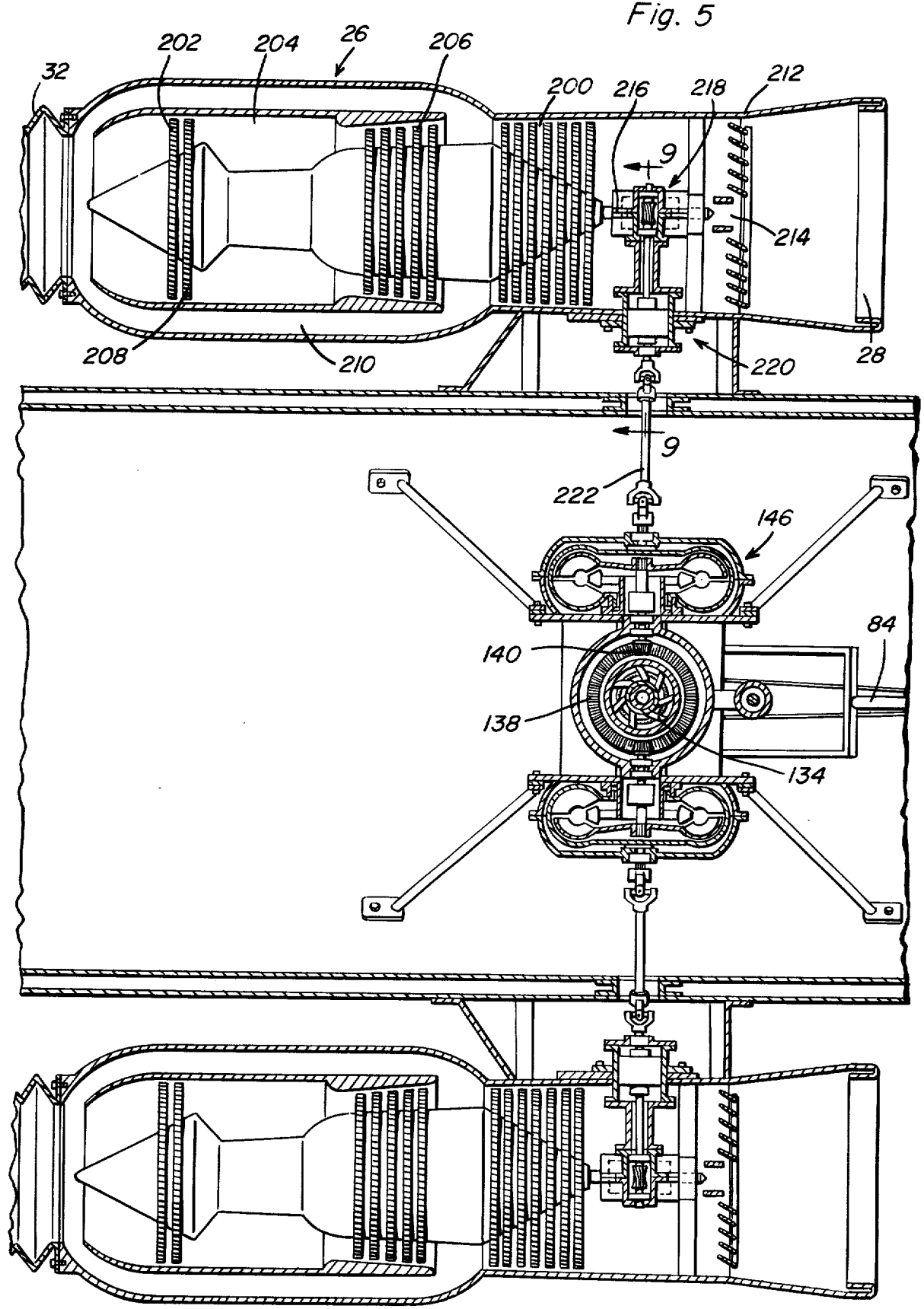
FIG. 5 is an enlarged top sectional view taken substantially through a plane indicated by section line 5—5 in FIG. 4.

Referring now to FIG. 5, each of the fan-jet engines 26 is of a conventional design wherein a low pressure compressor stage 200 is rotated by a low pressure turbine 202 in response to the flow of combustion products from the combustor 204. A high pressure compressor stage 206 rearwardly spaced from the lower pressure compressor stage is in turn driven by a high pressure turbine 208. Thus, during normal operation of the fan-jet engine 26, at a relatively high speed, there will be a by-pass flow of air induced by the low pressure compressor 200 through the annular by-pass air passage 210 to produce a combined exhaust jet for reaction thrust propulsion of the aircraft. Such operation will, of course, require the unobstructed inflow of air through the intake end 28 of the engine. In order to condition the engine for low speed operation, an adjustable vane assembly 212 is provided in the intake portion for reducing the inflow of air. The inflow of a minimum amount of air is, however, accommodated through the central opening 214, necessary to sustain operation of the engine 26 as a turbo-jet engine. Thus, with the inflow of air appropriately reduced through the adjustable vane assembly 212, low speed operation of the engine will be achieved with the engine then being mechanically loaded through a power take-off connected to the compressor shaft 216 of the low pressure compressor stage 200. Power take-off is provided by a reduction gear assembly 218 from each engine 26 to an associated one of the hydraulic torque converters 146 through a disengageable clutch assembly 220 and a universal connecting shaft 222. When the clutch 220 is disengaged, the engine 26 will be mechanically unloaded so that it may then be conditioned for normal operation at high speed.

Figure 9:
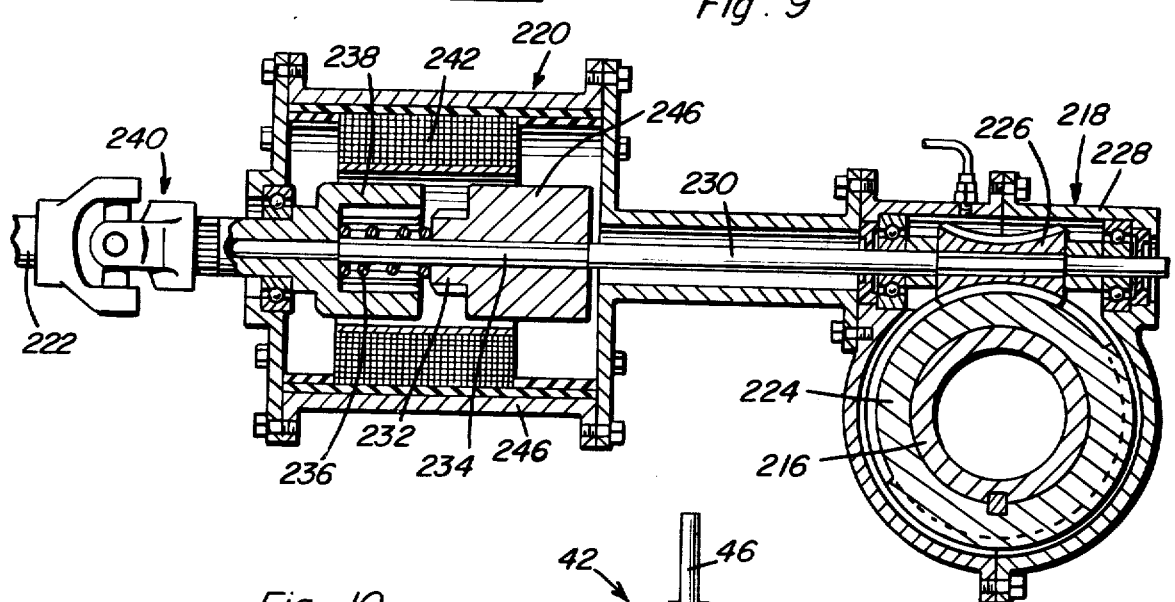
FIG. 9 is an enlarged partial sectional view taken substantially through a plane indicated by section line 9—9 in FIG. 5.

Referring now to FIG. 9, the reduction gear assembly 218 includes a worm wheel 224 splined to the compressor shaft 216 of the engine and enmeshed with the worm 226 enclosed within an oil filled housing 228. The worm 226 is connected by shaft 230 to the disengageable clutch assembly 220 which includes an axially shiftable, positive coupling element 232 slidably mounted on a splined end portion 234 of the shaft 230. The coupling element 232 is biased to a disengaged position by a spring 236 seated with an internally splined, driven coupling element 238 connected to the coupling shaft 222 through a universal joint 240. The drive coupling element 232 projects from a magnetic armature member 242 adapted to be axially shifted into a clutch engaging position in response to energization of a solenoid coil 244 supported in co-axial relation thereto by the clutch housing 246. By means of the disengageable clutch 220, the pilot may selectively interrupt transmission of torque from the engines to the rotor assembly and the rotary wing assembly in order to initiate autogyro operation of the aircraft.

Figure 8:
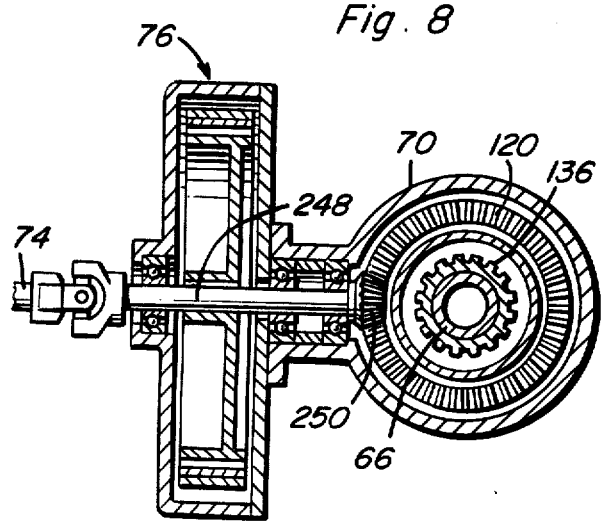
FIG. 8 is an enlarged partial sectional view, taken substantially through a plane indicated by section line 8—8 in FIG. 4.

When the forward speed of the aircraft has reached a sufficiently high value, so that the aircraft may be supported by the fixed wings, conventional high speed, fixed wing flight may be initiated by first braking rotation of the rotor assemblies by engagement of the mechanical brake assembly 76, as more clearly seen in FIG. 8, connected to the shaft 248 interconnecting the tail rotor drive shaft 74 with the bevel gear 250 in mesh with the tail rotor drive gear 120. Once the rotor assemblies are stopped, the rotary wing assembly may be retracted as hereinbefore described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an aircraft having an elongated fuselage, a rotor assembly, rotary wing means connected to the rotor assembly, power operated means connected to the rotor assembly for displacement between retracted and extended positions, and pitch control means comprising a non-rotatable casing axially displaceable with the rotor assembly between the extended and retracted positions, a control shaft operatively connected to the rotary wing means and extending through the rotor assembly, screw means slidably mounted in the casing for axial displacement of the control shaft, a nut rotatably mounted in the casing in engagement with screw means, cable means drivingly engaged with the nut for rotation thereof to impart axial displacement to the screw means and the control shaft, support means pivotally mounted in the fuselage and connected to the casing and operating means mounted on the support means for actuation of the cable means in the extended position of the rotor assembly.

2. In an aircraft having an elongated fuselage, a fixed wing secured to the fuselage, an attitude controlling tail assembly secured to the fuselage and reaction thrust generating means for forwardly propelling the fuselage along a longitudinal axis thereof; a rotor assembly, a rotary wing means connected to the rotor assembly for rotation during helicopter and autogyro operations, power operated means connected to the rotor assembly for displacement between retracted and extended positions relative to the fuselage, disengageable transmission means drivingly connecting the thrust generating means to the rotor and tail assemblies for powered rotation during said helicopter operation, control means for selectively disengaging the transmission means to unload the rotor and tail assemblies from the thrust generating means, and means for conditioning the thrust generating means while unloaded from the rotor and tail assemblies during autogyro and fixed wing operations to increase forward propulsion of the fuselage, the thrust generating means comprising a fan jet engine having a compressor and a turbine to which the transmission means is connected, said conditioning means including intake control means for reducing inflow of air to the compressor during helicopter operation.

3. The combination of claim 2 wherein said transmission means includes reduction gear means connected to the thrust generating means for transmitting torque therefrom, one-way clutch means for transmitting said torque in one direction to the rotor assembly during said helicopter operation, and clutch means selectively disengageable by the control means for interrupting said transmission of torque to mechanically unload the thrust generating means, whereby the rotary wing means overruns the rotor during autogyro operation in response to forward propulsion of the fuselage by the thrust generating means.

4. The combination of claim 2 including means fixed to the fuselage for locking the rotary wing means against rotation in the retracted position of the rotor assembly.

5. In an aircraft having an elongated fuselage, a fixed wing secured to the fuselage, an attitude controlling tail assembly secured to the fuselage and reaction thrust generating means for forwardly propelling the fuselage along a longitudinal axis thereof; a rotor assembly having a rotational axis in perpendicular intersecting relation to the longitudinal axis of the fuselage, rotary wing means connected to the rotor assembly for rotation during helicopter and autogyro operations, power operated means connected to the rotor assembly for displacement between retracted and extended positions relative to the fuselage, disengageable transmission means drivingly connecting the thrust generating means to the rotor and tail assemblies for powered rotation during said helicopter operation, control means rendered operative in the extended position of the rotor assembly for controlling the pitch of the rotary wing means during helicopter and autogyro operations, means for conditioning the thrust generating means while unloaded from the rotor and tail assemblies by the transmission means during autogyro and fixed wing operations to increase forward propulsion of the fuselage, and means for braking rotation of the rotor and tail assemblies, said transmission means including reduction gear means connected to the thrust generating means for power take-off therefrom, one-way clutch means for transmitting torque in one direction from the reduction gear means to the rotor assembly during said power take-off, and selectively disengageable clutch means for interrupting said transmission of torque during the autogyro and fixed wing operations to unload the thrust generating means, the thrust generating means comprising a fan jet engine having a compressor and a turbine to which the reduction gear means is connected, said conditioning means including intake control means for reducing inflow of air to the compressor during said power take-off, the pitch control means including a non-rotatable casing axially displaceable with the rotor assembly between the extended and retracted positions, a control shaft operatively connected to the rotary wing means and extending through the rotor assembly, screw means slidably mounted in the casing for axial displacement of the control shaft, a nut rotatably mounted in the casing in engagement with screw means, cable means drivingly engaged with the nut for rotation thereof to impart axial displacement to the screw means and the control shaft, support means pivotally mounted in the fuselage and connected to the casing and operating means mounted on the support means for actuation of the cable means in the extended position of the rotor assembly.

6. The combination of claim 5 including bearing means mounted on the power operated means for rigidly supporting the rotary wing means only in a direction parallel to the longitudinal axis of the fuselage to accommodate flapping laterally of the fuselage.

7. The combination of claim 6 including thrust direction controlling means connected to the thrust generating means for opposing attitude changing forces applied to the aircraft while in vertical motion during helicopter operation.

8. The combination of claim 7 including means fixed to the fuselage for locking the rotary wing means against rotation in the retracted position of the rotor assembly.

9. The combination of claim 8 wherein said rotor assembly includes an elongated, tubular rotor shaft having a lower end connected to the casing and an intermediate splined portion, said one-way clutch means being effectively engageable with the rotor shaft between the lower end and the splined portion in the extended position of the rotor assembly, and a tail rotor drive gear rotatably mounted by the fuselage in engagement with the splined portion of the rotor shaft.

10. The combination of claim 5 wherein said rotor assembly includes an elongated, tubular rotor shaft having a lower end connected to the casing and an intermediate splined portion, said one-way clutch means being effectively engageable with the rotor shaft between the lower end and the splined portion in the extended position of the rotor assembly, and a tail rotor drive gear rotatably mounted by the fuselage in engagement with the splined portion of the rotor shaft.

* * * * *